United States Patent [19]

Krug

[11] 4,035,021
[45] July 12, 1977

[54] VEHICLE SEAT BACK RECLINING MECHANISM

[75] Inventor: Robert C. Krug, Birmingham, Mich.

[73] Assignee: General Motors Corporation, Detroit, Mich.

[21] Appl. No.: 667,638

[22] Filed: Mar. 17, 1976

[51] Int. Cl.² .................................... A47C 1/025
[52] U.S. Cl. .......................... 297/369; 74/98
[58] Field of Search .................. 297/366–369, 297/354, 355, 365, 373, 378, 379; 16/139, 140, 145–147; 74/98, 96, 533, 534

[56] References Cited

U.S. PATENT DOCUMENTS

| 2,853,121 | 9/1958 | Herider et al. | 297/367 |
|---|---|---|---|
| 3,299,466 | 1/1967 | Werner | 297/366 X |
| 3,710,418 | 1/1973 | Kratzer | 297/362 X |
| 3,848,923 | 11/1974 | Dehler | 297/366 |
| 3,866,270 | 2/1975 | Suzuki et al. | 297/369 X |

FOREIGN PATENT DOCUMENTS

| 694,400 | 12/1930 | France | 297/367 |
|---|---|---|---|
| 931,033 | 7/1955 | Germany | 297/367 |

Primary Examiner—Roy D. Frazier
Assistant Examiner—William E. Lyddane
Attorney, Agent, or Firm—Charles E. Leahy

[57] ABSTRACT

A seat back frame member and a seat cushion frame member are connected by a pivot to permit adjustment of the reclining angle of the seat back. A sector is provided on the seat back frame member and is serrated to display a plurality of teeth disposed in an arcuate path about the seat back pivot. First and second latch bars, each having a serrated arcuate end surface, are pivotally mounted on the seat cushion frame member for pivotal movement between engaged positions in which the teeth of the latch bars engage the teeth of the sector and disengaged positions. A spring acts between the latch bars to urge rotation of the latch bars in opposite directions of rotation to their respective engaged positions. When the latch bars are in engaged position, forced pivoting of the back frame member in either direction relative the cushion frame member causes one of the latch bars to be forcibly wedged against the sector while the other latch bar tends to pivot in the disengaging direction. Gear teeth provided on each of the latch bars mesh together so that pivotal movement of one of the latch bars in one direction rotates the other latch bar in the opposite direction. Accordingly, attempted pivoting of the seat back frame member in either the forward or rearward direction causes the latch bars to grip the sector with a pincer-like action so that both latch bars block rotation of the back frame. An operating handle is provided on one of the latch bars to permit manual pivoting movement of that latch bar to disengaged position while the gear interconnection simultaneously moves the other latch bar to the disengaged position.

3 Claims, 2 Drawing Figures

VEHICLE SEAT BACK RECLINING MECHANISM

BACKGROUND OF THE INVENTION

The invention relates to a seat back reclining mechanism for a vehicle seat.

It is known to provide a pivotal mount between a seat back frame member and a seat cushion frame member in a vehicle seat so that the reclining angle of the seat back can be adjusted relative the seat cushion. It is also known to provide a locking mechanism which is normally engaged to lock the seat back against adjusting movement and is selectively disengageable to permit adjustment of the seat back angle.

SUMMARY OF THE INVENTION

The present invention provides an improved seat back reclining mechanism.

According to the invention a sector is provided on the seat back frame member and is serrated to display a plurality of teeth disposed in an arcuate path about the seat back reclining pivot. First and second latch bars, each having a serrated arcuate end surface, are pivotally mounted on the seat cushion frame member for pivotal movement between disengaged positions and engaged positions in which the teeth of the latch bars engage the teeth of the sector. A spring acts between the latch bars to urge rotation of the latch bars in opposite directions of rotation to their respective engaged positions. When the latch bars are in engaged position, forced pivoting of the back frame member in either direction relative the cushion frame member causes one of the latch bars to be forcibly wedged against the sector while the other latch bar tends to pivot in the disengaging direction. Gear teeth provided on each of the latch bars mesh together so that pivotal movement of one of the latch bars in one direction rotates the other latch bar in the opposite direction. Accordingly, attempted pivoting of the seat back frame member in either the forward or rearward direction causes the latch bars to grip the sector with a pincer-like action so that both latch bars block rotation of the back frame. An operating handle is provided on one of the latch bars to permit manual pivoting movement of that latch bar to disengaged position while the gear interconnection simultaneously moves the other latch bar to the disengaged position.

BRIEF DESCRIPTION OF THE Drawing

These and other objects, advantages, and features of the invention will become apparent upon consideration of the specification and the appended drawings in which.

DESCRIPTION OF THE PREFERRED EMBODIMENT

Figure 1:
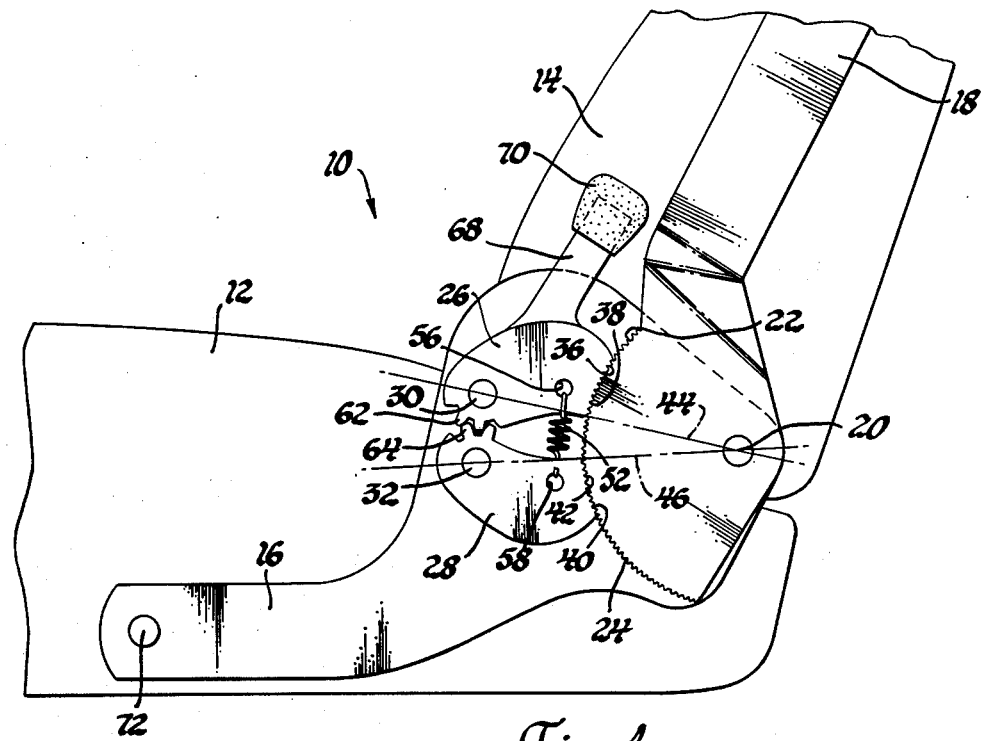
FIG. 1 is a side elevation view of a seat back reclining mechanism according to the invention and showing the reclining mechanism in the latched position.

Referring to FIG. 1, a vehicle seat generally indicated at 10 includes a seat cushion 12 and a seat back 14. The seat cushion 12 has a frame member 16 at each side thereof. The seat back 14 has a frame member 18 at each side thereof. The seat cushion frame member 16 and the seat back frame member 18 are pivotally connected to one another by a pivot pin 20 which permits pivotal movement of the seat back 14 to permit adjustment of the angle of the seat back 14 relative the seat cushion 12. It will be understood that although the drawings show such a pivotal connection on the outboard end of the seat, a similar pivotal connection between the cushion frame member 16 and a back frame member 18 would be provided at the other end of the seat.

The back frame member 18 has a sector 22. The surface of a sector 22 is serrated to provide a plurality of small teeth 24 which are disposed in an arcuate path about the pivot pin 20.

A locking mechanism is provided for engagement with the teeth 24 of the sector 22. The locking mechanism includes a pair of latch bars 26 and 28 which are respectively pivotally mounted on the seat cushion frame member 16 by pivot pins 30 and 32. The latch bar 26 has a concave end surface 36 having a radius of curvature substantially equal to the radius of curvature of the sector 22. The end surface 36 of the latch bar 26 is serrated to provide teeth 38 which mesh with the teeth 24 of the sector 22. Similarly, the latch bar 28 has a concave end surface 40 which is serrated to provide a plurality of teeth 42.

As seen in FIG. 1, the teeth 38 of latch bar 26 do not extend to within an arc subtended by a line 44 which is drawn through the seat back pivot pin 20 and the pivot pin 30 of the latch bar 26. Accordingly, the latch bar 26 can be pivoted in the counterclockwise direction about its pivot pin 30 to carry the latch bar teeth 38 out of engagement with the sector teeth 24. The latch bar teeth 42 of latch bar 28 likewise do not extend to within an arc subtended by a line 46 drawn from pivot pin 20 to the pivot pin 32 so that the latch bar teeth 42 can be carried out of engagement with the sector teeth 24 when the latch bar 28 is rotated in the clockwise direction about its pivot pin 32. The pitch and depth of the sector teeth 24 and the latch bar teeth 38 and 42 is preferably very small so that interengagement between the teeth will not impede pivoting of the latch bars 26 and 28, to the disengaged position. Furthermore, small teeth allow small increments of adjusting movement of the seat back.

A coil tension spring 52 has its respective ends engaged in apertures 56 and 58 of the respective latch bars 26 and 28 to urge both latch bars into engagement of the sector 22 as shown in FIG. 1.

Figure 2:
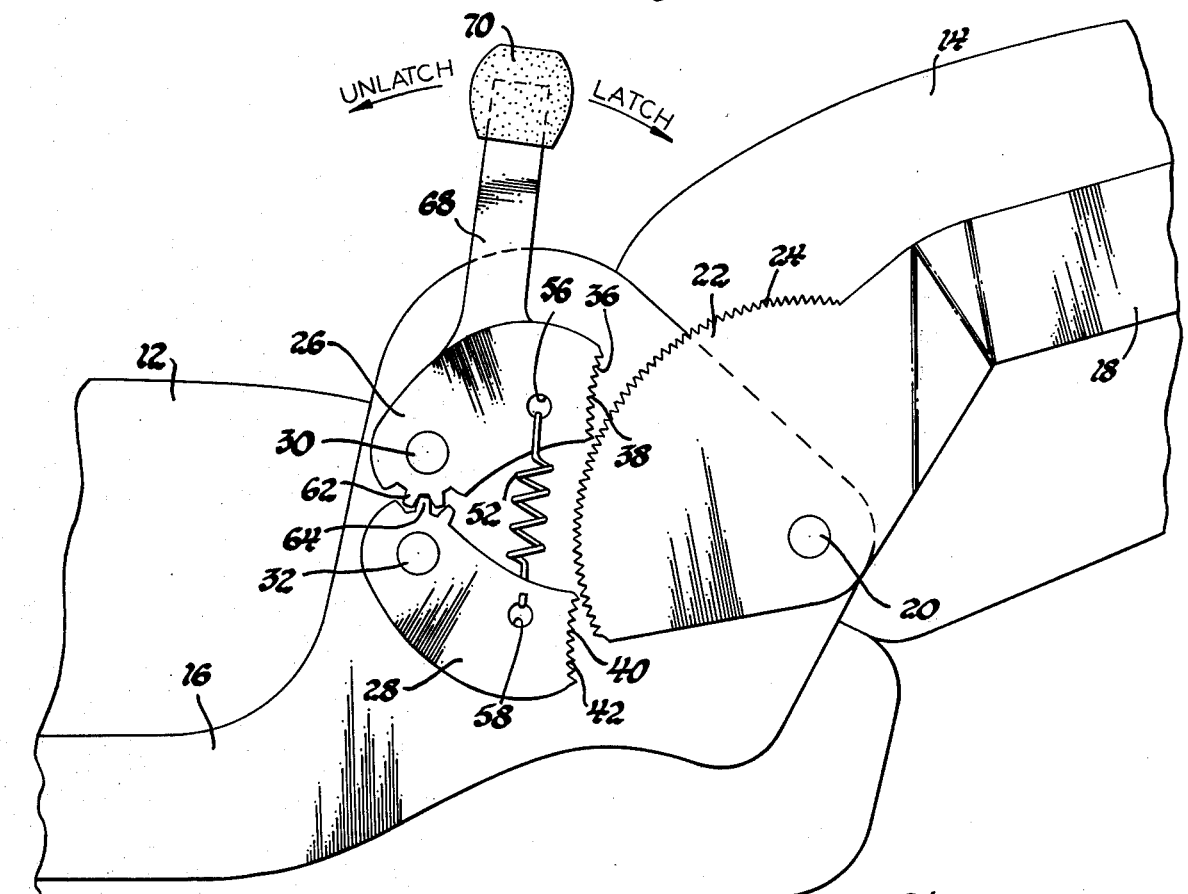
FIG. 2 is an enlarged view similar to FIG. 1, but showing the reclining mechanism in the unlatched position permitting adjustment of the seat back reclining angle.

The latch bars 26 and 28 are respectively provided with gear teeth 62 and 64 which mesh with one another to interconnect and synchronize the pivotal movement of the latch bars 26 and 28. An operating handle 68 having a knob 70 is provided on the latch bar 26 to permit the seat occupant to manually pivot the latch bar 26 in the counterclockwise disengaging direction to the disengaged position of FIG. 2. When the latch bar 26 is pivoted in the counterclockwise disengaging direction, the interconnection between the gear teeth 62 and 64 simultaneously pivots the latch bar 28 in the clockwise disengaging direction to the disengaged position of FIG. 2. The spring 52 urges return of the latch bars 26 and 28 to their engaged position of FIG. 1.

Referring to FIG. 1, it will be understood that an attempted forced pivoting of the seat back in the forward direction will pivot the sector 22 counterclockwise about pivot pin 20. The engagement of the sector teeth 24 with the latch bar teeth 38 causes the latch bar 26 to be carried with the sector 22 and urge pivoting of the latch bar 26 in the clockwise direction about the pivot pin 30. Thus, the latch bar 26 is wedged between its pivot pin 30 and the sector teeth 24 to wedgingly block pivoting of the seat back 14. This attempted counterclockwise pivoting of the sector 22 tends to pivot latch bar 28 in the disengaging direction so that the latch bar teeth 42 would ratchet off the sector teeth 24. However, the interconnection between the latch bars 26 and 28 provided by a meshing of gear teeth 62 and 64 causes the latch bar 28 to be pivoted in the opposite direction of the latch bar 26. The resulting cooperation between latch bars 26 and 28 is in the nature of a pincer action with the latch bar 26 providing a primary wedging effort and the latch bar 28 providing a supplementary latching effort.

When a rearward acting force is applied to the seat back 14, the sector 22 attempts pivoting in the clockwise direction about the pivot pin 10. Accordingly, the latch bar 28 provides the primary latching while the gear interconnection forces latch bar 26 in the opposite direction to provide the supplementary latchings. Thus, it is seen that latch bars 26 and 28 are synchronized to pivot in opposite directions and provide a pincer action the sector 22. Accordingly, the vehicle seat back reclining mechanism of the invention is effective to block seat back movement in either the forward or rearward direction of angle adjustment.

It will be understood that the locking mechanism is provided only at the outboard end of the seat. Furthermore, it will be understood that the seat cushion frame member 16 may be pivotally interconnected to the seat cushion 12 by a pivot pin 72 so that the seat back 14 can be pivoted forwardly over the seat cushion 12 as is desired for access to the rear seat of a two-door vehicle.

What is claimed is:

1. In a vehicle seat having a cushion frame member, a back frame member, and a seat back pivot means pivotally connecting the back frame member to the cushion frame member to permit adjustment of the angle of the back frame member relative the cushion frame member, the combination comprising:

a sector on one of the frame members being serrated to display a plurality of teeth;

first and second latch bars, each latch bar having teeth for meshing with the teeth of the sector;

first and second pivot means respectively mounting the first and second latch bars on the other of the frame members for pivotal movement between engaged positions in which the teeth of the latch bars engage the teeth of the sector and disengaged positions;

the first latch bar acting to block forward pivoting movement of the seat back by being wedged between the sector and the first pivot means of the first latch bar;

the second latch bar acting to block rearward pivoting of the seat back by being wedged between the sector and the second pivot means of the second latch bar;

and means interconnecting the latch bars so that pivotal movement of one of the latch bars toward the engaging position forcibly pivots the other latch bar toward the engaging position whereby both first and second latch bars block pivoting of the sector and back frame in either the forward or rearward direction relative the cushion frame member.

2. In a vehicle seat having a cushion frame member, a back frame member and seat back pivot means pivotally connecting the back frame member to the cushion frame member to permit adjustment of the angle of the back frame member relative the cushion frame member, the combination comprising:

a sector on one of the frame members being serrated to display a plurality of teeth disposed in an arcuate path;

first and second latch bars, each latch bar having an arcuate end surface being serrated to provide teeth for meshing with the teeth of the sector;

first and second pivot means respectively mounting the first and second latch bars on the other of the frame members for pivotal movement between engaged positions in which the teeth of the latch bars engage the teeth of the sector and disengaged positions;

spring means acting on the latch bars to urge rotation of the latch bars in opposite directions of rotation to their respective engage positions;

forced pivoting of the back frame member in either direction relative the cushion frame member when the latch bars are in engaged position causing one of the latch bars to block pivoting of the sector while the other latch bar tends to ratchet over the sector;

gear means connecting the latch bars that pivotal movement of one of the latch bars in one direction forcibly rotates the other latch bar in the opposite direction whereby both latch bars block rotation of the sector and back frame member relative the cushion frame member;

and means for moving the latch bars to the disengaged position to permit adjustment of the angle of the back frame member relative the cushion frame member.

3. In a vehicle seat having a cushion frame member, a back frame member, and seat back pivot means pivotally connecting the back frame member to the cushion frame member to permit adjustment of the angle of the back frame member relative the cushion frame member, the combination comprising:

a sector on one of the frame members, said sector being serrated to display a plurality of teeth disposed in an arcuate path about the seat back pivot means;

first and second latch bars, each latch bar having a concave end surface of curvature substantially equal to the curvature of the sector and being serrated to provide teeth for meshing with the teeth of the sector;

first and second pivot means respectively mounting the first and second latch bars on the other of the frame members for pivotal movement between an engaged position in which the teeth of the latch bars engage the teeth of the sector and a disengaged position;

the first and second latch bars and the sector being arranged so that when the latch bars are in the engaged position the latch bar teeth do not extend to within an arc subtended by lines drawn through the seat back pivot means and the pivot means of the first and second latch bars so that the engaged teeth do not prevent pivoting movement of the latch bars in opposite directions of rotation to their respective disengaged positions;

spring means urging pivoting of the latch bars in opposite directions of rotation relative one another to their respective engaged positions;

said pivoting of the back frame member in either direction relative the cushion frame member when the latch bars are in engaged position causing one of the latch bars to block pivoting of the sector while the other latch bar tends to ratchet over the sector;

gear means in conection between the latch bars so that pivotal movement of one of the latch bars in one direction forcibly rotates the other latch bar in the opposite direction whereby both latch bars block rotation of the sector and back frame member relative the cushion frame member;

and an operating handle connected to one of the latch bars permitting pivoting of that latch bar to the disengaged position while the gear means simultaneously moves the other latch bar to the disengaged position.

* * * * *